United States Patent
Kuna et al.

(10) Patent No.: US 7,537,025 B2
(45) Date of Patent: May 26, 2009

(54) FAUCET DEVICE

(75) Inventors: Rafal Kuna, Jarfalla (SE); Stanislaw Klaczany, Stockholm (SE)

(73) Assignee: Kuna Group AB, Järfälla (SE)

( * ) Notice: Subject to any disclaimer, the term of this patent is extended or adjusted under 35 U.S.C. 154(b) by 309 days.

(21) Appl. No.: 11/307,750

(22) Filed: Feb. 21, 2006

(65) Prior Publication Data

US 2006/0192161 A1    Aug. 31, 2006

Related U.S. Application Data

(60) Provisional application No. 60/593,929, filed on Feb. 25, 2005.

(30) Foreign Application Priority Data

Feb. 25, 2005    (SE) ................................. 0500436

(51) Int. Cl.
*F16K 31/524* (2006.01)
*F16K 31/00* (2006.01)
(52) U.S. Cl. .................... 137/616.5; 251/349
(58) Field of Classification Search ............ 137/615, 137/616, 359, 801, 616.5; 251/349, 350, 251/351, 352, 353, 354, 153, 251, 297; 4/675, 4/678

See application file for complete search history.

(56) References Cited

U.S. PATENT DOCUMENTS

| 656,759 | A | * | 8/1900 | Wirt | 137/313 |
|---|---|---|---|---|---|
| 3,593,961 | A | | 7/1971 | Stewart | |
| 3,610,280 | A | * | 10/1971 | Kitamura | 137/616.5 |
| 3,620,241 | A | * | 11/1971 | Brown | 137/216 |
| 3,765,455 | A | | 10/1973 | Countryman | |

(Continued)

FOREIGN PATENT DOCUMENTS

FR    2068037    8/1971

OTHER PUBLICATIONS

PCT Application No. PCT/SE2006/050008, International Search Report mailed May 8, 2006, 5 pgs.

(Continued)

*Primary Examiner*—John Rivell
*Assistant Examiner*—Atif H Chaudry
(74) *Attorney, Agent, or Firm*—Schwegman, Lundberg & Woessner, P.A.

(57) ABSTRACT

The invention relates to a faucet device for dispensing of a pressurised fluid, for example water, comprising an outlet member, preferably a spout, and a shut-off mechanism, said outlet member having an initial position (A) in which the flow of fluid through the outlet member is shut off, said shut off mechanism being arranged such that said outlet member, when subjected to an external force in a certain first direction enters a self-closing open position (B) allowing flow through the same, and when said force is no longer applied said outlet member returns to its initial position by self closing means, wherein said shut-off mechanism (20; 110; 210; 310) further is arranged such that when the outlet member (10; 100; 200; 300) is subjected to a force in a second direction different from said first direction it is releasably held in a certain position (C) allowing flow through the same. The invention also relates to a method for dispensing of pressurised fluid by means of a faucet device.

26 Claims, 10 Drawing Sheets

U.S. PATENT DOCUMENTS

| | | | |
|---|---|---|---|
| 3,888,461 A | 6/1975 | Bron | |
| 4,037,624 A | 7/1977 | Turner et al. | |
| 4,147,181 A | 4/1979 | Hashimoto | |
| 4,356,998 A | 11/1982 | Bach et al. | |
| 4,662,396 A * | 5/1987 | Avnon | 137/616.7 |
| 4,761,839 A | 8/1988 | Ganaway | |
| 4,768,557 A | 9/1988 | Holzer | |
| 5,284,170 A | 2/1994 | Larsen | |
| 5,988,593 A | 11/1999 | Rice | |
| 6,058,973 A | 5/2000 | MacAusland et al. | |
| 6,079,448 A | 6/2000 | Lee | |
| 6,641,727 B1 * | 11/2003 | Aldred et al. | 210/232 |
| 2005/0087717 A1 * | 4/2005 | Burke | 251/263 |
| 2008/0110511 A1 | 5/2008 | Kuna et al. | |

OTHER PUBLICATIONS

PCT Application No. PCT/SE2006/050008, Written Opinion of the International Searching Authority mailed May 8, 2006, 4 pgs.

* cited by examiner

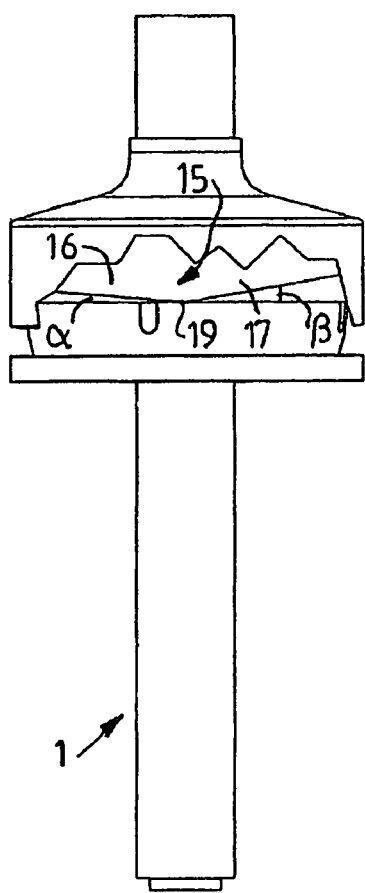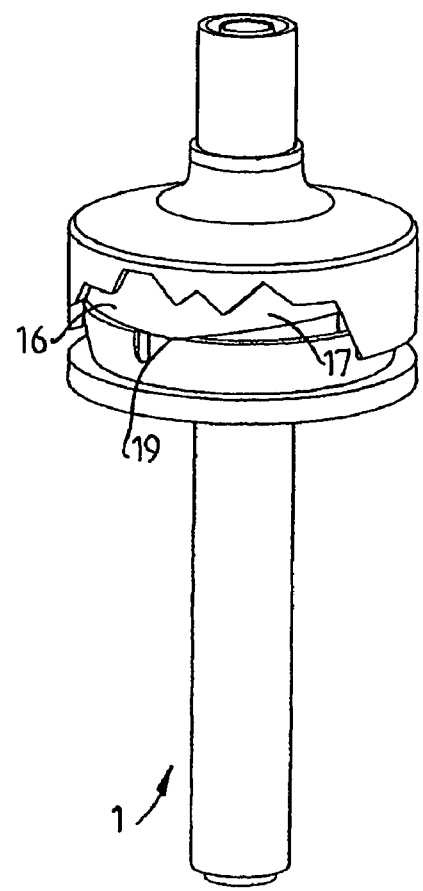
*FIG. 5A*  *FIG. 5B*

FAUCET DEVICE

CROSS-REFERENCE TO RELATED APPLICATION

This application claims the benefit of earlier filed U.S. provisional patent Application No. 60/593,929 filed Feb. 25, 2005.

TECHNICAL FIELD

The present invention relates to a faucet for dispensing a pressurised fluid. In particular, the invention relates to a method and apparatus for dispensing a pressurised fluid by means of a faucet device that enables a steady position for single handed opening with self-closing action that is particularly suitable for use by the disabled, elderly, children etc.

BACKGROUND

Various number of faucets, particularly water faucets, are known from prior art, providing different techniques to control the flow of fluid. Regarding water faucets, the most common types have been faucets utilizing both hot and cold water. In the past these faucets had separate water control valve members in the form of water control units or knobs that were individually controlled to turn on or off the flow of water through the spout of the water faucet. More recently faucets with a single water control unit have been developed, in order to eliminate the use of two separate water control units, simplifying the control of water temperature. In the above cases the water control units are generally disposed adjacent to the spout of the faucet, but separate from the spout. The use of these prior art water faucet devices requires the use of both hands to turn the water faucet and simultaneously position a glass or the like under the outlet of the spout.

Due to possible contamination of water sources the concern about obtaining purified or filtered water has increased in recent years. As a result a significant water treatment industry has been developed to provide people with purified or filtered water. Different types of filtration devices have been developed to ensure delivery of high quality water to consumers in homes and businesses.

For these water purification devices, special faucets were developed to produce the external flow of water to be used by the consumers. These faucets generally did not have both hot and cold water options, but were primarily utilized to deliver cold water of high purity.

As prior art water faucet devices need an action both to turn on and to turn off the water faucet, a problem occurs when a user forgets to turn it off, as loss of water occurs, which might be significant. Disabled persons may further have difficulties operating such faucets. There was thus a need for self-closing water faucet devices, especially for delivering high purity water, preferably devices that would permit the flow of water out of the water faucet to be stopped by merely removing a user's hand from contact with the water control unit of the water faucet device, and that would even permit a user to use the same one hand to both turn the water on and to simultaneously pour water into a glass or the like.

There exists various types of faucet devices for delivering liquids of different kind that are naturally or automatically turned off, present in cafés, restaurants companies, public places and similar locations, and particularly water faucet devices, some with the need of two hands to turn the water on and simultaneously pour water in to a glass or the like, and some which even provide the possibility to use one hand to simultaneously turn it on and pour water into a glass or the like. These devices are generally quite complicated and expensive and not suitable for private use.

U.S. Pat. No. 5,988,593 discloses a water faucet with spout which is used to control whether water is dispensed from the water faucet or not dispensed therefrom. The spout of the water faucet in its normal, untouched position functions to prevent water from flowing through the water faucet for external use. If the spout is raised or lowered, there is a flow of water through the water faucet because of a valve located within the spout and a base member holding the spout at a bottom portion thereof.

A disadvantage with U.S. Pat. No. 5,988,593 is that the risk for leakage between lower portion of the spout and the interior surface of the base support member is quite significant tilting and up and down movements of the spout, and due to wear on the gasket caused by these movements. Due to tilting of the spout, wear on the T-shaped valve member is also likely. The up and down motion option is unnatural and thus in that case the user has to "fight" gravity which is not particularly intuitive or convenient for e.g. disabled persons. When operated there is no clear position, i.e. the spout is floating configured, which makes the operation unstable, and there is a risk of spilling water. Further, the wedged shaped member used does not provide a good solution to achieving continuous flow as it is not very smooth to handle, i.e. it needs to be moved down the spout, which might cause difficulties if it does not run smoothly, and then wedged between the base support member and the spout in order to lock the spout in a continuous flow position. There is also the risk of the wedged shaped member getting stuck there, and also the risk of the wedged shaped member sliding down when not intended, causing an unintended continuous flow.

U.S. Pat. No. 4,356,998 discloses a self-closing valve with a tiltable outlet member which is supported in a valve housing by means of a ball-and-socket type support and which, when forcibly tilted, lifts a pressure-biased valve plate off an upstream-facing valve seat in the housing. The valve plate incorporates a radially or axially protruding gasket, clamped or vulcanized in place, or the valve seat is part of a resilient seat ring insert. Resilient sealing and shock-dampening members cooperate with the tiltable outlet member.

A disadvantage with U.S. Pat. No. 4,356,998 is that it is not suitable for filling large containers as it only provides a self-closing closing valve, which needs to be subjected to an outside force during the whole filling process, which is not convenient when filling larger containers, and even quite limited containers. Further, the large flat sealing surface area causes this solution to be sensitive to sealing material deformation with leakage as a result after a short time in service. In stand-by position there is no external force applied to the sealing gaskets which causes the risk of water leakage through the spout in closed position (dripping faucet). Further, when trying to open the water flow through the faucet the user is expected to push the end of the spout, which action can cause the spout to turn around its axis instead of expected tilting rendering the faucet to remain closed.

OBJECTS OF THE INVENTION

An object of the present invention is to provide a faucet device for dispensing fluid which is very easy and convenient to operate.

Another object of the present invention is to provide a method for dispensing fluid, which is very easy and convenient.

SUMMARY OF THE INVENTION

These and other objects, apparent from the following description, are achieved by a faucet which is of the type stated by way of introduction and which in addition exhibits the features recited in the characterising clause of the appended claims 1 and 20. Preferred embodiments of the inventive faucet device are defined in appended subclaims 2-19, 21-22.

An advantage with the present invention according to claim 1 is that it offers two functions: a clear and steady position for one hand operated self-closing opening action, such that it is naturally or automatically turned off when a person discontinues use of the water device, thus making handling very easy and smooth; a glass can be filled with water with one hand quickly and easily, and further a clear and steady fixed open position, for continuous water flow through the faucet such that larger containers, e.g. pitchers, can be filled easily. The faucet may advantageously be used by disabled persons having difficulties opening and closing conventional faucets. For opening and closing of the faucet, the spout itself is used, thus there is no need for knobs, handles or large valve housings, which facilitates making the spout small, which saves material and installation space, making the faucet device more universal and better fit for e.g. different kitchen designs. The solution with the moving spout makes it possible to hide the shut-off mechanism under simple continuous outer shapes which are considerably easier to wipe clean than traditional faucets. The faucet further enables ease of purified water use for children.

Preferably the outlet member, i.e. the spout, is arranged to release from the fixed position when the spout is subjected to a force substantially opposite to the second direction. This is an easy way of shutting off the continuous flow.

Advantageously the faucet device has guide means for guiding the outlet member movement between said positions. This makes handling of the faucet even easier as the movement between the positions becomes steadier.

Preferably said second direction is opposite to said first direction, which further increases usability.

Preferably the outlet member, i.e. the spout, is tiltable, making it even easier to operate.

Advantageously the outlet member, i.e. the spout, is pivotable about its axis. This further increases usability, as it is possible to pour water through the spout at any desired angle around the same.

Preferably the outlet member, i.e. the spout, is vertical, which is simply the most convenient placement from a user's point of view, and consequently further increases usability.

Preferably the invention further comprises the features of claim 8. The spherical member facilitates a simple design, makes the movement of the spout easy and at the same time supports the housing, said housing protecting the spherical member and a shut-off valve.

Preferably sealing means is leak tightly arranged such that when the shut-off valve is closed no fluid is allowed through the channel configuration, which ensures that no leakage occurs when the spout is in its initial closed position. More preferably sealing members are also provided in said housing, the sealing member being part of a seat for the spherical member. This ensures that fluid only flows through the channel configuration when the spout is in an open position. Further the sealing members functions as a back up to the sealing means when the spout is in the closed position. Double sealing is thus provided, increasing reliability due to the negligible risk of leakage.

Preferably the shut-off valve is resiliently arranged upstream of the spherical member, providing a simple design which is reliable and resistant to wear.

Advantageously the faucet device further comprises the features in claim 12. This provides a way of controlling the shut-off valve via the spout which is reliable. The arrangement is further easy to manufacture.

Preferably the faucet device further comprises the features of claim 13, providing a way of controlling the different positions of the spout which is reliable. The arrangement is further easy to manufacture.

Preferably the faucet device further comprises the features of claim 14, providing a very simple and reliable way of facilitating the self-closing movement.

Preferably the invention further comprises the features of claim 15. The guide member provides an easy way of guiding the outlet member, i.e. the spout such that it only may be used in two opposite directions, and further controls the inclination of the spout.

DESCRIPTION OF THE DRAWINGS

A better understanding of the present invention will be had upon the reference to the following detailed description when read in conjunction with the accompanying drawings, wherein like reference characters refer to like parts throughout the several views, and in which:

FIGS. 5a-5c show different views of a detail of the faucet device in FIG. 2.

DETAILED DESCRIPTION OF THE INVENTION

Figure 1:
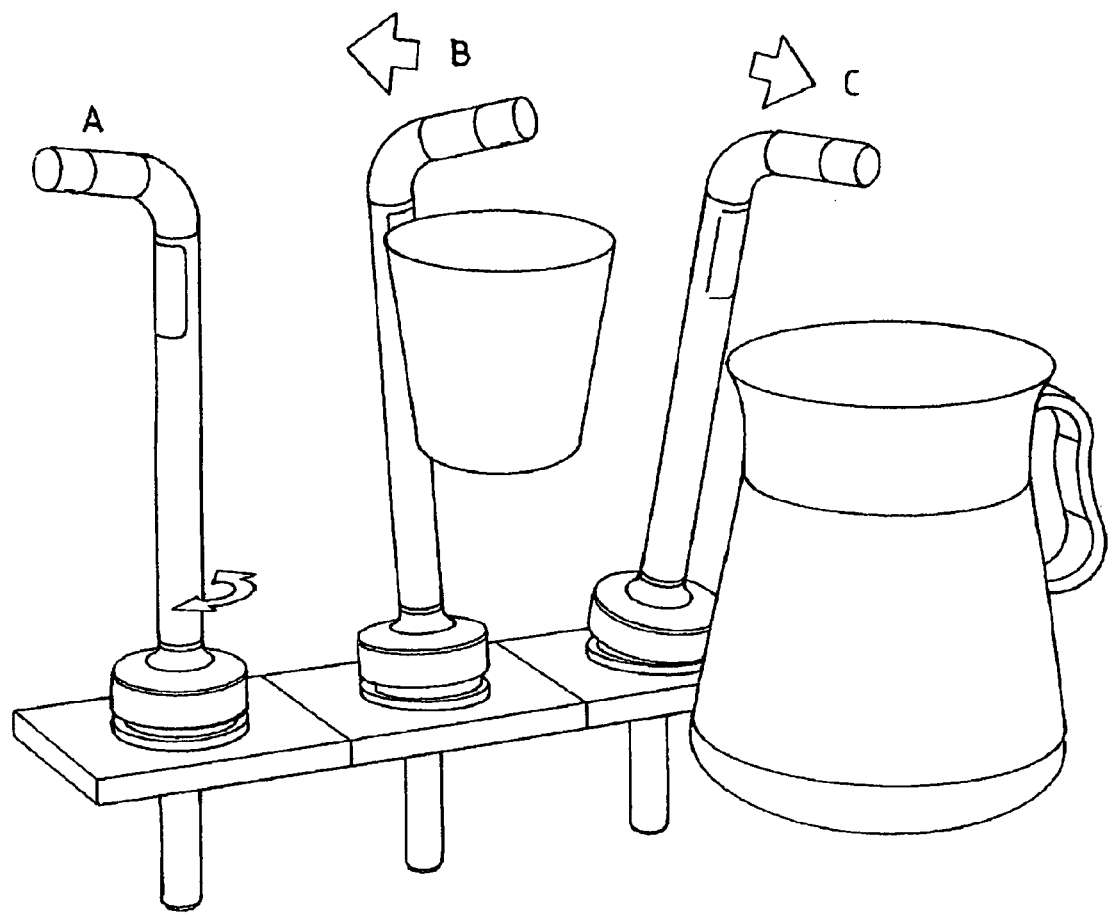
FIG. 1 shows a perspective view of the faucet device according to the present invention in different operating positions, mounted on a sink unit.
Figure 2:
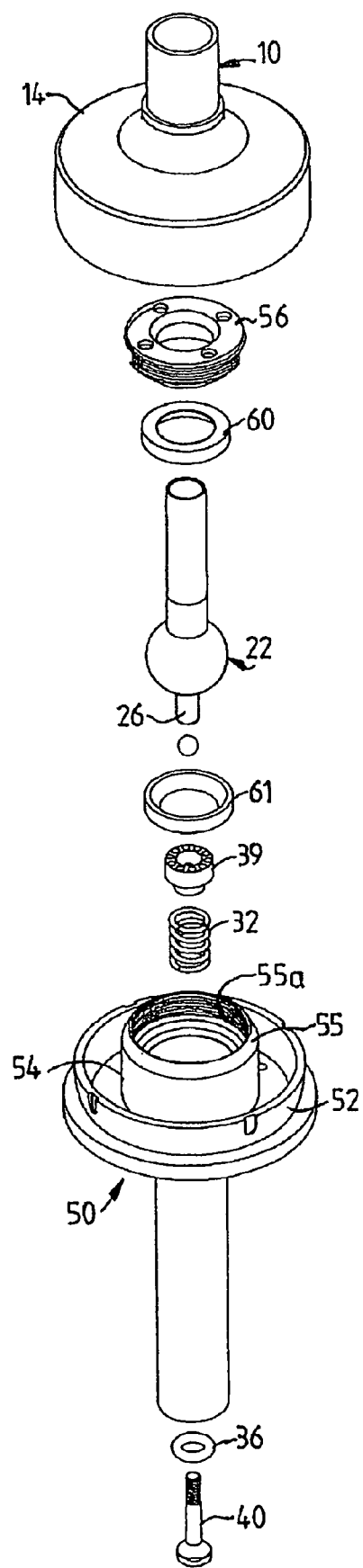
FIG. 2 shows an exploded view of the faucet device according to a preferred embodiment of the present invention.
Figure 3:
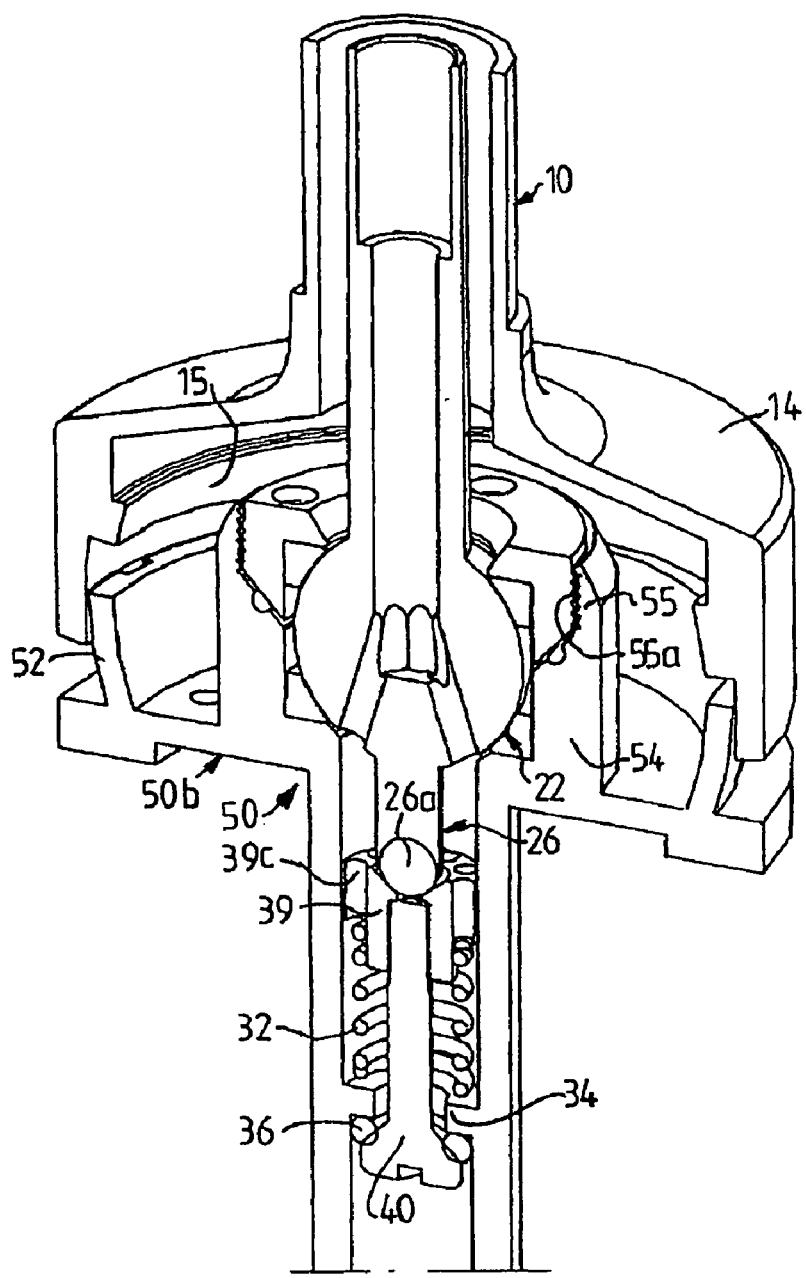
FIG. 3 shows a perspective view of a cross section of the faucet device in FIG. 2.
Figure 4:
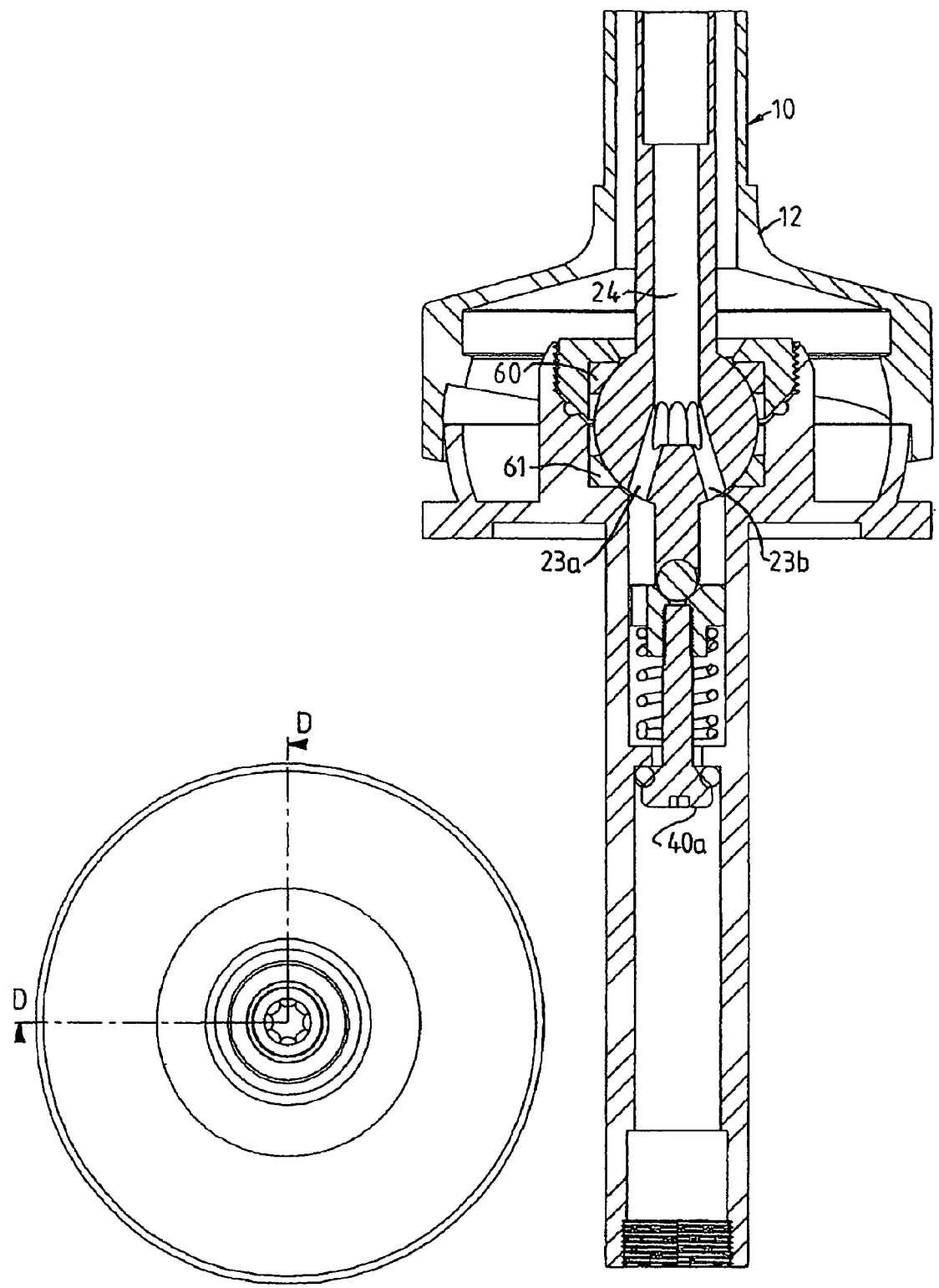
FIG. 4 shows a cross sectional view of the faucet device in FIG. 2.

FIG. 1 shows a perspective view of a faucet device according to the present invention, in different operation positions A, B, C. The different embodiments of the faucet device according to the present invention are intended to function as a faucet for dispensing of water, preferably but not necessarily from water filter and water purification apparatus. The faucet comprises a shut-off means which allows opening and closing of the water flow, and a spout. The faucet device further comprises attachment means for mounting it on, for example as shown in FIG. 1, a sink unit, or any other support surface.

As can be seen in FIG. 1, in the shut-off position the spout is in its initial position A. When operated, the faucet is intended to be handled in two ways, also shown in FIG. 1. By pressing the spout backwards, away from the user, by means of a glass or the like, the spout will be in its self-closing position B, and water will flow through the spout as long as the pressure remains on the spout. When the glass or the like is removed the spout will automatically return to the initial position A, i.e. straighten itself up, and thereby turn off the water flow through the spout. By pulling the spout towards the user, the spout will then be moved from its initial position A and be held in a certain position C, wherein water will be flowing out from the spout even when the pressure is removed from the spout, and the spout needs to be shut-off manually, i.e. the spout functions as an on-off control member. The fixed position C is intended to be used when larger vessels are to be filled. In addition the spout is pivotable 360° and facilitates use according to above in an endless number of angles.

FIGS. 2-6 show different views of a faucet device 1 according to a preferred embodiment of the present invention. The faucet device comprises an outlet member 10, preferably a spout 10, a shut off mechanism 20, and a housing 50, where said shut-off mechanism 20 is arranged within the housing 50. The upstream portion 12 of the spout 10 extends radially outwardly forming a cap portion 14. The cap portion 14 is tiltably and rotatably connected to the housing 50. The housing 50 preferably has a circular configuration.

The shut-off mechanism 20 comprises a substantially spherical member or a ball like member 22 having a channel configuration 23 running through it, with through holes 23a, 23b, 24, a spigot 26 integrated in the ball 22, and a resilient shut-off valve 30. The spigot 26 is integrated in the ball 22 such that they form one piece, where a portion 28 of the spigot 26 protrudes out from the ball 22 in the upstream direction. Alternatively, the spigot could be a separate part, where one portion of the spigot 26 is screwed into the ball and the remaining portion 28 protrudes out from the ball 22 in the upstream direction. The end portion 26a of the spigot is preferably a ball 26a movably arranged about its centre in the spigot 26. Upstream of the end portion 26a of the spigot 26 is arranged, within the upstream portion 50a of the housing 50, the shut-off valve 30. The shut-off valve 30 comprises a resilient member 32, preferably a coil spring 32, arranged on a flange 34, preferably ring shaped, an o-ring 36 arranged upstream of the flange, and a closing member 38.

The closing member 38 comprises an downstream part 39 connected to the downstream portion 32a of the spring 32 and an elongated upstream part 40 integrated into the centre of the downstream part 39, the upstream part 40 preferably being a screw member 40 with a hat portion 40a, and a threaded portion 40b, which is screwed into the downstream part 39. The hat portion 40a of the screw member 40 is located upstream of the o-ring 36 and the elongated portion 40b of the screw runs through the o-ring 36 and flange 34. The downstream part 39 of the closing member 38 has on its downstream end 39a a recess 39b, preferably funnel- or cone-shaped, and an edge 39c, or a plateau 39c. There are further provided a plurality of through holes 39d on said edge 39c running through the downstream part of the closing member 38 in the upstream/downstream direction, intended to allow fluid there through when the shut-off valve 30 is in an open position.

When the faucet 1 is shut-off the spigot 26 is in contact with the central portion 39b-1 of the funnel-shaped recess 39b because of the spring 32 pressing the closing member 38 in the downstream direction. In this shut off position the upstream part 40 of the closing member 38, i.e. the screw member 40, or rather the hat 40a of the screw member, presses against the o-ring 36, closing the opening through which fluid, preferably water, is intended to flow, making it leak tight.

The housing 50 has a substantially T-shaped form and preferably has a circular cross-section. The housing 50 further comprises an outer wall 52 protruding in the downstream direction from the periphery of a downstream portion 50b of the T-shaped housing 50, said wall 52 being in movable contact with the cap portion 14 of the spout 10. The housing 50 also has an inner wall 54 protruding in the downstream direction from the downstream portion 50b of the T-shaped housing 50, being slightly higher than the outer wall 52. The inner wall 54 forms a cavity in which the ball 22 is received. The inside 55a of the downstream portion 55 of the inner wall 54 is preferably threaded. A closing member 56, preferably a screw nut 56, is attached to the downstream portion 55 of the inner wall 54 forming a room with an opening 58 at the downstream side, in which room the ball 22 is contained. The ball 22 has a tubular shaped extension portion 22a having a smaller diameter than the ball 22. The ball 22 is arranged in the room in such a way that the extension portion 22a of the ball 22 is protruding in the downstream direction through the opening 58 of the room and into the upstream portion 12 of the spout 10 where it is fixedly and leak tightly connected.

In the room, tightly surrounding the ball 22, are arranged low friction sealing members 60, 61, preferably Teflon plates, such that the ball 22 is rotatably and tiltably arranged in the room, and such that the room is leak tight. This means that the centre of the ball 22 is fixed in the same position, i.e. the ball 22 can not move upstream, downstream or sideways relative to its centre, but can freely rotate about its axis, and the axis of the ball 22 may be tilted about its centre. The ball 22 functions as the bearing of the shut-off mechanism 20 and the central suspension point.

Figure 5C:
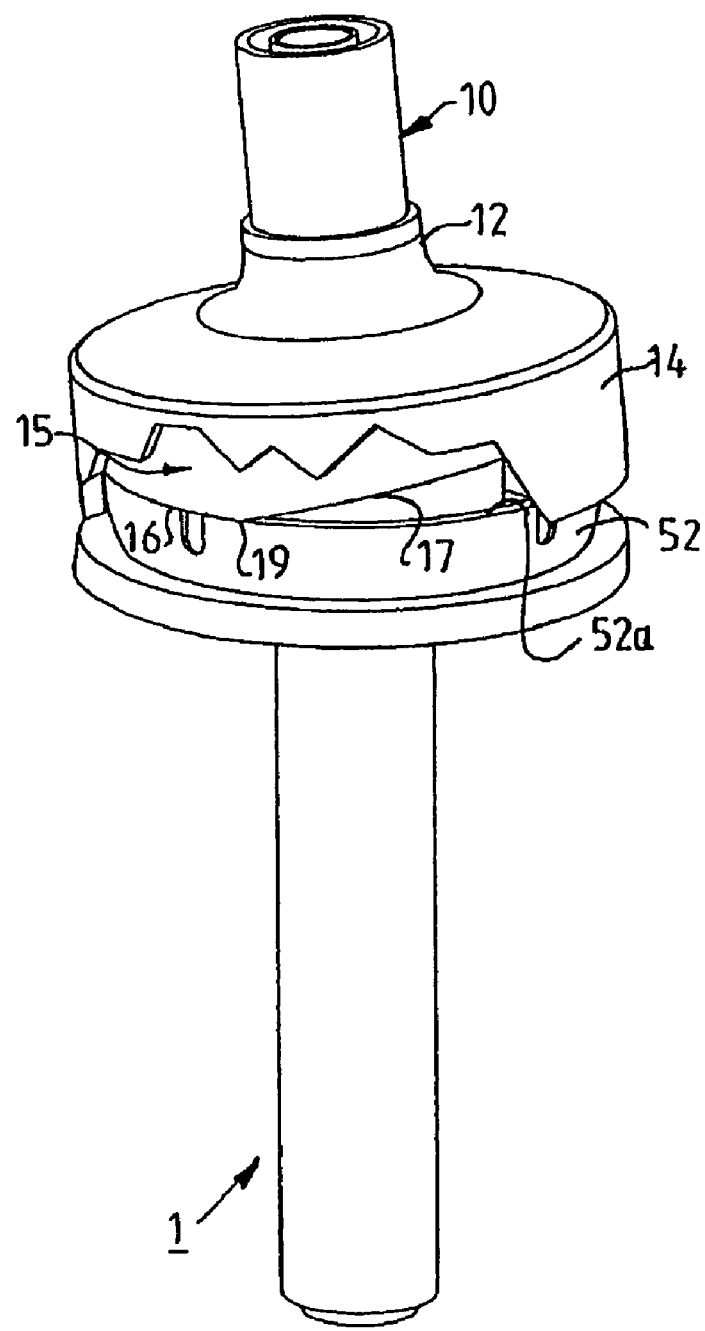

FIGS. 5a-c, show a guiding member 15 of the faucet device in different views. The guiding member 15 is integrated internally in the cap portion 14 of the spout 10. The guiding member 15 preferably forms part of the internal of the cap portion 14 thus having a ring shape or hollow cylindrical shape. The guiding member 15 is formed as a projection, preferably having a V-shaped configuration, i.e. the upstream side of the guide member is "cut" in such a way that it forms imaginary planes forming a V in which imaginary planes the ridge terminates at opposite ends of the upstream side of the guide member forming tips 19 at opposite sides. The tips 19 face the edge 52a of the downstream wall 52 off the housing 50 resting against the same. In the initial position A the imaginary planes forms different angles α, β relative to the edge, preferably 5° and 10°. The tips 19 or rather the shape of the guide member 15 prevents the spout 10 from being tilted in any other direction than towards or against the outlet opening 10a of the outlet member 10 and thus guides the spout 10 such that it only may be moved in two opposite directions. The guide member has a first portion 16 functioning as a blocking member 16, allowing a smaller inclination of the spout, e.g. 5°, and a second portion 17, which allows a larger inclination of the spout, e.g. 10°. In other words the guide member 15 has four support points or surfaces, the first portion 16, supporting the spout in position B, the second portion 17, supporting the spout in position C, and the tip pair 19 supporting the spout in position A and during the movements towards B or C, and preventing tilting in any other direction than straight between the positions B and C.

Figure 6C:
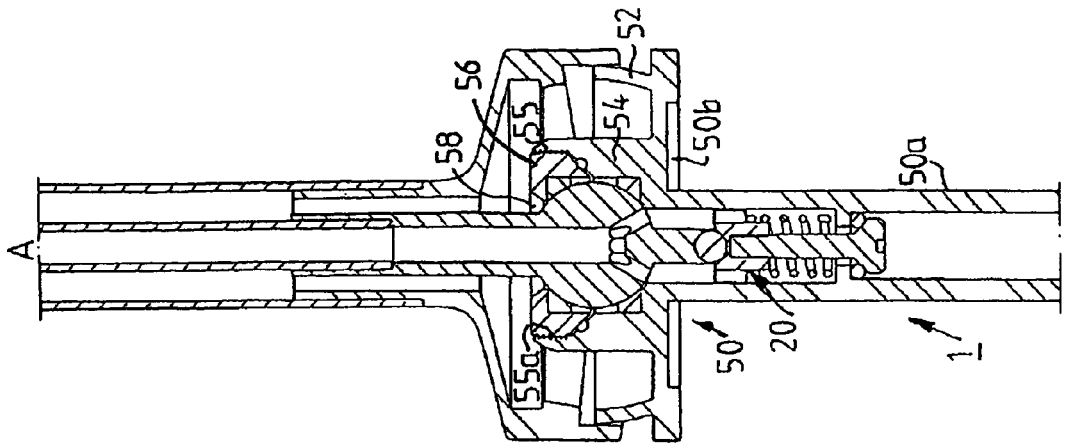
FIGS. 6a-6c show a cross-sectional view of the different operating positions of the faucet device in FIG. 2.

When the ball 22 is in its initial position A, i.e. the spout being in the vertical position, the water is shut-off and is not flowing into the spout, as shown in FIG. 6c. When the spout is moved from its initial position, i.e. is tilted, the in the ball 22 integrated spigot 26 presses the shut-off valve 30 upstream, and due to the upstream movement the hat 40a of the screw member 40 of the valve 30 is separated from the o-ring 36 and the water flows through the opening of the valve 30 and continues through the channel configuration 23a, 23b, 24 of the ball 22 and into the spout 10, as shown in FIGS. 6a and 6b.

Figure 6B:
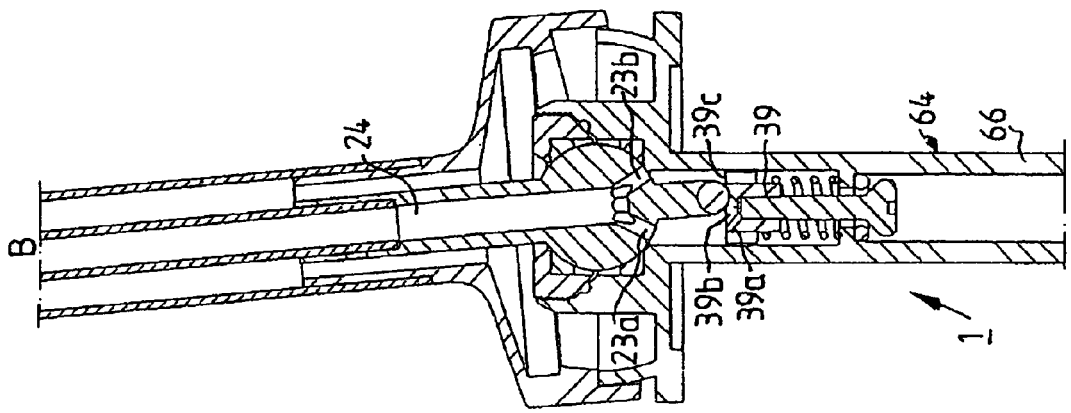
Figure 6A:
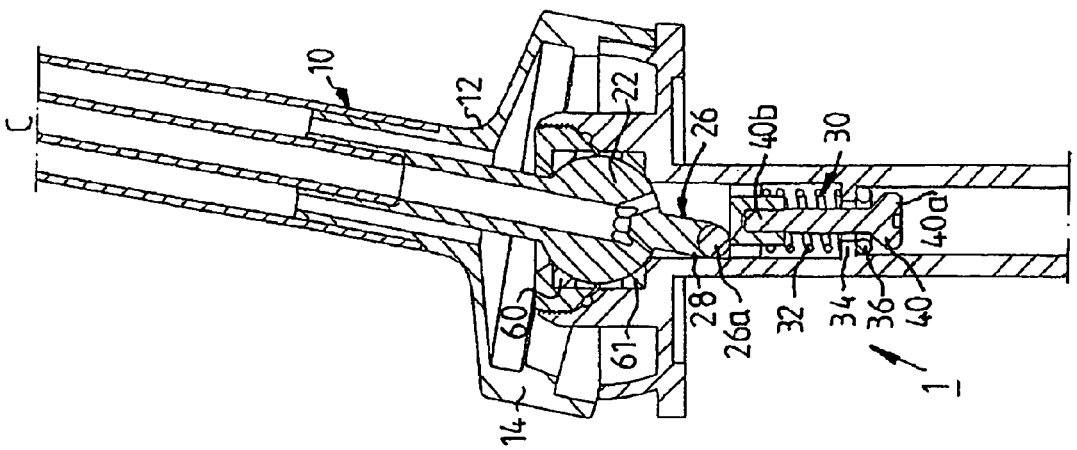

If the movement of the spout is made in the direction towards the user, i.e. the spout is tilted towards the user, as shown in e.g. FIG. 6a, the inclination preferably being approximately 10°, the guide spigot 26 will end up resting, i.e. is held, on the plateau 39c of the downstream part 39 of the closing member 38, said plateau constituting the edge of the recess 39b. The inclination is determined by the angle β formed between the second portion 17 of the guide member 15 and the edge 52a. In that way the spout is held in a fixed open position C wherein water continues to flow through the spout 10 of the faucet 1 when the pressure on the spout is released, i.e. when the user lets go of the spout 10. By pressing the spout 10 lightly in the opposite direction the guide spigot 26 is returned to its initial position A in the centre, whereby the pressure on the shut-off valve 30 is reduced and the spring and water pressure moves the valve 30 downstream until the o-ring 36 is tightly squeezed between the hat portion 40a of the screw member and the flange, leak tightly closing the opening, and consequently the water stream through the spout 10 is shut off.

The spout 10 may also be moved from its initial position A in the direction away from the user, i.e. the spout is tilted away from the user to a self-closing position B, as shown in e.g. FIG. 6b, the inclination preferably being approximately 5°, with the same effect as described above, with the exception that the guide spigot 26 never will reach the plateau 39c due to the first portion 16 of the guide member, functioning as a block member 16. When the spout 10 is tilted in direction away from the user the block member 16, is arranged to touch the edge of the downstream wall of the housing 52 when the tilting of the spout 10 will reach an angle of preferably around 5° rendering further tilting movement impossible. This blocking point is reached before spigot 26 will reach plateau 39c, preventing the spout 10 from moving to a position which enables the guide spigot 26 to reach the plateau 39c. The effect of this is that as soon as the pressure on the spout 10 is released, i.e. the user lets go/ removes the glass or the like, the guide spigot 26 will force the spout 10 of the faucet back to the initial position A and the water stream is shut off, in the same manner as described above.

The faucet device comprises attachment means 64 for attaching the faucet on a sink unit or the like. The attachment means preferably comprises a threaded member 66, preferably located on the upstream portion of the housing 50, such that the faucet device easily can be screwed on a sink unit or the like.

Although any orientation of the main axis of the spout 10 and shut-off mechanism 20 has been contemplated, the preferred orientation, in the shut-off position A, is vertical.

Figure 7:
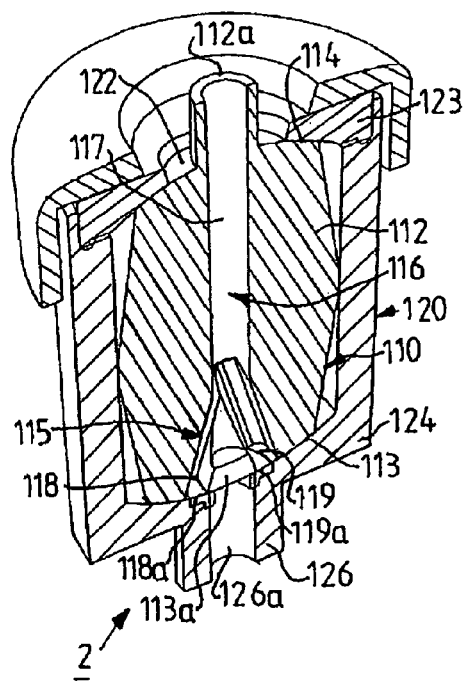
FIG. 7 shows schematically a cross sectional perspective view of a faucet device according to a first alternative embodiment of the present invention.

FIG. 7 shows schematically a cross-sectional perspective view of a first alternative embodiment of a faucet device according to the present invention. The faucet device 2 comprises an outlet member 100, preferably a spout 100 (not shown), a shut off mechanism 110, and a housing 120, where said shut-off mechanism 110 is arranged within the housing 120.

The shut-off mechanism comprises a tiltable member 112, having a spherical-shaped upstream and downstream side 113, 114, comprising a Y-shaped channel configuration 116 running through the main axis of said tiltable member 112. The downstream portion 117 of the channel configuration is a single channel 117. On the centre of the downstream side 114 of the tiltable member 112 is a preferably tube-shaped protrusion 112a through which the single channel 117 run, said protrusion 112a extending through an opening 122 on the downstream side of the housing 120, and is intended to be fixedly connected to the spout. In the upstream portion of the channel configuration 116, the single channel 117 transforms in to two channels 118, 119 terminating at the upstream side 113 of the tiltable member 112 with two openings 118a, 119a separated from each other a certain distance.

The housing 120 preferably has a circular cross-section. The housing 120 comprises an intermediate part 123 with a low friction surface tightly arranged against the downstream side 113 of the tiltable member 112, and an upstream portion 124 with low friction means arranged tightly against the upstream side 113 of the tiltable member, such that the tiltable member 112 can be tilted and rotated within the housing 120. The housing 120 further comprises a preferably tube-shaped portion 126 on the upstream side of the same and protruding in the upstream direction, said tube portion 126 being intended to be connected to a water supply conduit such that pressurised water will flow through it and against the upstream side 113 of the tiltable member 112. The inner diameter of the tube portion is slightly smaller than the distance between the openings 118a, 119a of the separated channels, such that it is a leak tight between the upstream opening 126a of the tube portion 126 and the upstream side 113 of the tiltable member 112 in the initial, shut-off position A. The tiltable member 112 is also rotatable about its main axis such that the spout may be pivoted.

When the spout is subjected to a force such that it is tilted, one of the openings 118a of the separated channel faces the opening 126a of the tube portion 126 and flow of fluid is allowed through the channel configuration 116 and the spout such that a container may be filled. There is arranged resilient means on a side of the tiltable member such that if the spout is tilted away from the user it is automatically returned to its original position when pressure is removed, i.e. the user lets go. There is arranged locking means on a side of the tiltable member such that if the spout is tilted towards the user it is locked in a fixed position C, allowing continuous flow. In this position the flow is shut-off manually by pressing the spout in the opposite direction.

Although any orientation of the main axis of the spout 100 and shut-off mechanism 110 has been contemplated, the preferred orientation, in the shut-off position A, is vertical.

Figure 8:
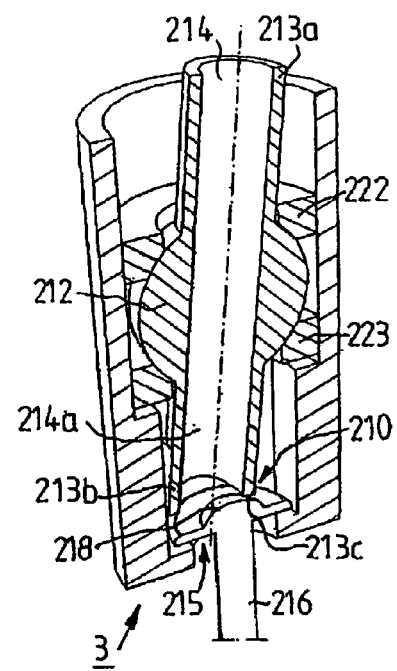
FIG. 8 shows schematically a cross sectional perspective view of a faucet device according to a second alternative embodiment of the present invention.

FIG. 8 shows schematically a cross-sectional perspective view of a second alternative embodiment of a part of a faucet device according to the present invention. The faucet device 3 comprises an outlet member 200, preferably a spout 200 (not shown), a shut off mechanism 210, and a housing 220, where said shut-off mechanism 210 is arranged within the housing 220.

The shut-off mechanism 210 comprises a ball like member 212 with a channel 214 running through the centre axis of the same. The ball 212 has, on opposite sides of the ball along its main axis, a tubular shaped extension portion 213a, 213b having a smaller diameter than the ball. The tubular shaped extensions 213a, 213b forms part of the channel 214. The shut of mechanism 210 further comprises a resilient closing member 216 located upstream of the ball like member 212, and arranged such that it, in the shut-off position A, leak tightly closes the upstream opening 214a of the channel 214. The closing member 216 has on the surface facing the upstream opening of the channel a bump 218 or spherical cap 218 with a diameter coinciding with the inner diameter of the channel 214.

The housing 220 preferably has a circular configuration. The housing substantially surrounds the shut-off mechanism 210. Within the housing 220, tightly surrounding the ball 212, are arranged low friction sealing members 222, 223, preferably Teflon plates, such that the ball 212 is rotatably and tiltably arranged in the room formed by the housing and the low friction member 222, 223, and such that the room is leak tight. This means that the centre of the ball 212 is fixed in the same position, i.e. the ball 212 can not move upstream, downstream or sideways relative to its centre, but can freely rotate about its axis, and the axis of the ball 212 may be tilted about its centre. The housing 220 has an opening at the centre of the upstream side, to which opening a water supply conduit is intended to be connected. The ball like member 212 is also rotatable about its main axis such that the spout may be pivoted.

When the spout is subjected to a force such that it is tilted the closing member 216 is forced in the upstream direction by means of pressure exerted on the bump 218 by the tubular-shaped extension 213b. Fluid is then allowed to flow through the channel 214 and the spout such that a container may be filled. If the spout is tilted away from the user it is automatically returned, as the resilient closing member 216 presses against a portion of the edge of the tube shaped extension 213b, forcing it to slide back to the shut-off position A when pressure is removed, i.e. the user lets go. There is arranged locking means on a side of the ball like member such that if the spout is tilted towards the user it is locked in a fixed position C, allowing continuous flow. In this position the flow is shut-off manually by pressing the spout in the opposite direction.

Although any orientation of the main axis of the spout 200 and shut-off mechanism 210 has been contemplated, the preferred orientation, in the shut-off position A, is vertical.

Figure 9:
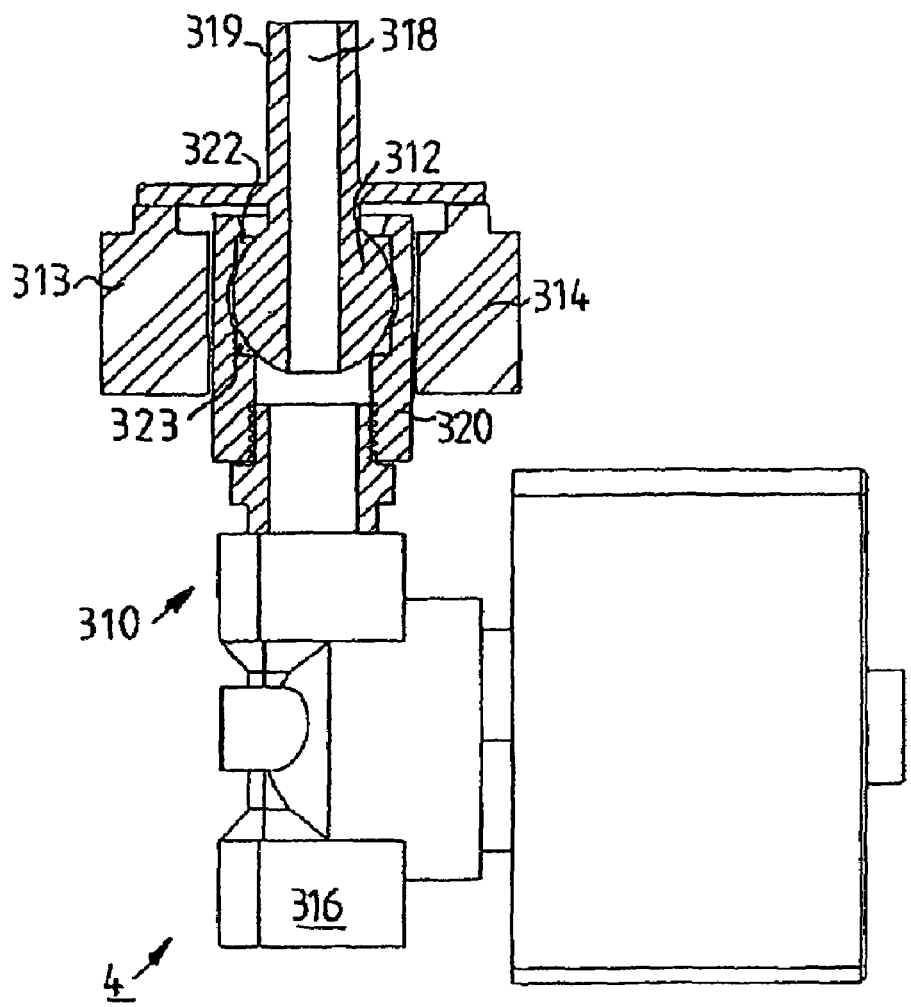
FIG. 9 shows schematically a cross sectional perspective view of a faucet device according to a third alternative embodiment of the present invention.

FIG. 9 shows schematically a cross-sectional perspective view of a second alternative embodiment of a part of a faucet device according to the present invention.

The faucet device 4 comprises an outlet member 300, preferably a spout 300 (not shown), a shut off mechanism 310, and a housing 320.

The shut-off mechanism 310 comprises a ball like member 312, a first and second micro switch member 313, 314, and a magnetic valve 316. There is a channel 318 axially running through the centre of the ball like member 312. The ball has a tubular shaped extension portion 319 having a smaller diameter than the ball. The tubular shaped extensions 319 forms part of the channel 318 and protrudes in the initial shut-off position in the downstream direction.

The housing 320 preferably has a circular configuration. The housing 320 surrounds the ball like member 312. Within the housing 320, tightly surrounding the ball 312, are arranged low friction sealing members, preferably Teflon plates, such that the ball 312 is rotatably and tiltably arranged within the housing 320, and leak tight. This means that the centre of the ball 312 is fixed in the same position, i.e. the ball 312 can not move upstream, downstream or sideways relative to its centre, but can freely rotate about its axis, and the axis of the ball may be tilted about its centre. On opposite sides of the ball 312, outside the housing 320 are the micro switch members 313, 314 arranged respectively. The magnetic valve 316 is arranged upstream of the housing 320. There is a water supply conduit connected to the faucet device, such that pressurised water will flow through the channel and spout when the magnetic valve 316 is open.

When the spout is subjected to a force such that it is tilted away from the user the first micro switch member 313 is arranged in contact with the magnetic valve 316 such that the valve 316 opens and water is allowed through the spout, and when the pressure on the spout is released the valve closes 316. When the spout is subjected to a force such that it is tilted towards the user, i.e. in the opposite direction, the second micro switch member 314 is arranged in contact with the magnetic valve 316 such that the valve 316 opens and water is allowed through the spout, and when pressure is released water continuous to flow. If the spout is tilted back to its initial position manually the magnetic valve 316 is shut off by means of the second micro switch 314, such that the flow is stopped.

Although any orientation of the main axis of the spout 300 and shut-off mechanism 310 has been contemplated, the preferred orientation, in the shut-off position A, is vertical.

As shown in FIGS. 1-9 the different embodiments, although having different technical implementations, share a common function of the faucet device, i.e. the handling of the same. In the above embodiments the outlet member, i.e. the spout, serving as an actuator, and consequently the shut-off mechanism, is tiltable, with an initial position A, where the faucet devices is shut-off, a self-closing position B which automatically closes when no longer subjected to an outside force, and a fixed position C, which need to be shut-off manually in order to stop the continuous flow. Below, another aspect of the present invention is disclosed, presenting the same basic function but with a reciprocating movement of the outlet member, i.e. the spout, still serving as an actuator, and of the shut-off mechanism.

As an alternative to the micro switches, optical switches may be used, with basically the same function.

Figure 10:
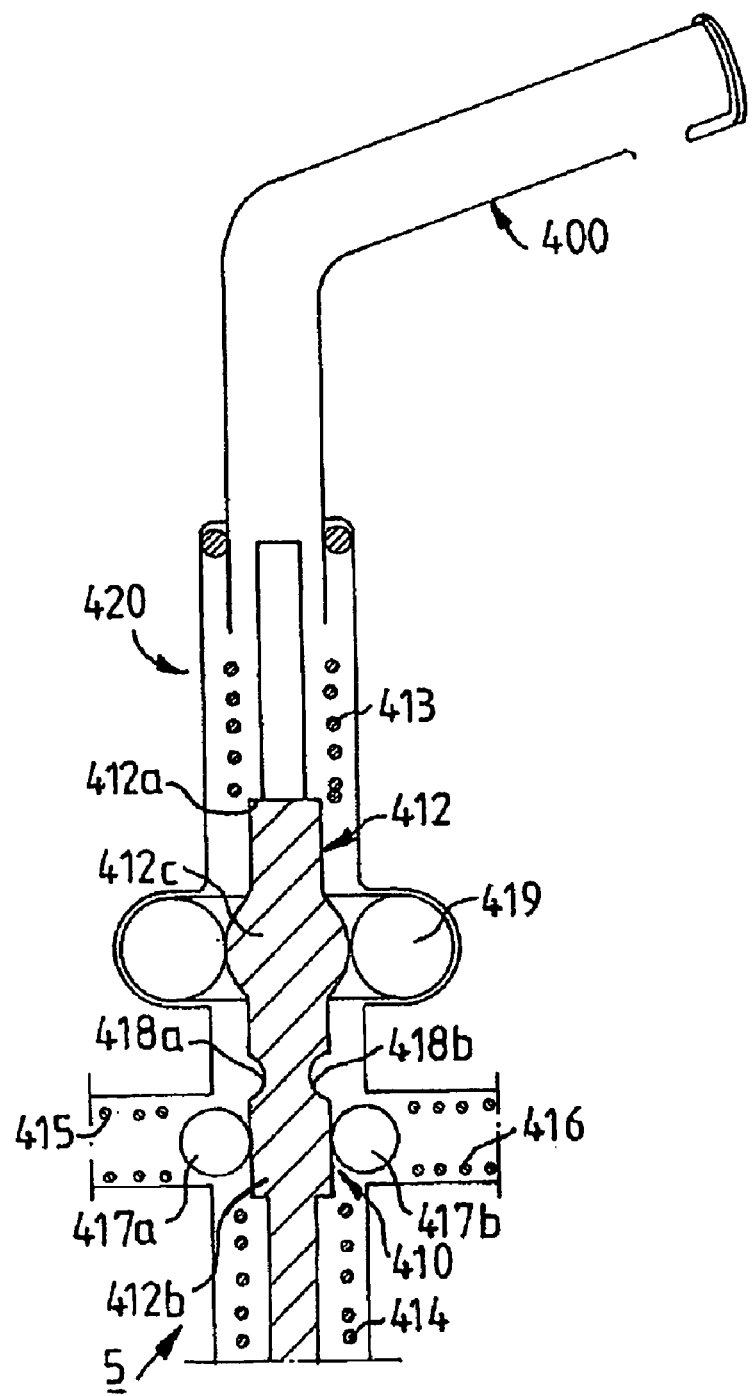
FIG. 10 shows an elevational view of an embodiment according to another aspect of the present invention.

FIG. 10 shows a perspective cross-sectional view of an embodiment according to another aspect of the present invention. The faucet device 5 comprises an outlet member 400, preferably a spout 400, a shut off mechanism 410, and a housing 420, where said shut-off mechanism 410 is arranged within the housing 420.

The shut-off mechanism 410 comprises a piston 412 axially movably arranged within the housing 420, a downstream spring member 413 connected to the downstream side 412a of the piston 412, an upstream spring member 414 connected to the upstream side 412b of the piston 412, side spring members 415, 416 arranged to supply a force from opposite sides of the upstream portion of the piston 412 via ball like members 417a, 417b, preferably steal balls or the like. The central portion 412c of the piston 412 has a convexity about itself. The piston 412 further has at its upstream portion 412b a pair of recesses 418a, 418b provided opposite to each other. The shut-off mechanism 410 further comprises an o-ring 419, which in the shut off position A leak tightly surrounds the piston 412. The piston is further connected to the spout 400, i.e. the spout is movable in the axial, or up- and downstream direction.

In the initial position A i.e. the shut off position, the supply of fluid to the spout 400 is shut off due to the large o-ring 419 leak tightly surrounding the movable piston 412, and the piston 412 is balanced between the downstream and upstream spring members 413, 414 in an equilibrium state where the o-ring 419 seals the fluid opening.

When the spout 400 is subjected to a force in the downstream direction the piston 412 is arranged to move in the same direction, and is further arranged to release from the o-ring 419, allowing fluid to flow there through to the spout 400. In this open position B both spring members 413, 414 are loaded and as soon as pressure is released the spring members 413, 414 will pull the piston back to the initial position A and the fluid is shut off as the o-ring 419 seals the opening.

When the spout 400 is subjected to a force in the upstream direction the piston 412 moves in the same direction, and releases from the o-ring 419, allowing fluid to flow there through to the spout 400. When the piston 412 is moved in the upstream direction the two spring loaded balls 417a, 417b will be pressed into each of the two recesses 418a, 418b on the piston 412 respectively. In this way the piston 412, and consequently the spout 400, is held in a fixed position C. The spring force exerted on the balls 417a, 417b is sufficient to hold the piston 412, and thus the spout 400, in the fixed open position C. In order to release the spout 400 from the fixed position an opposite force, i.e. a downstream force, needs to be applied to the spout 400. When the spout 400 is in the fixed position C and is subjected to a downstream force, the spring loaded balls 417a, 417b will release from the recesses 418a, 418b and the spring members 413, 414 will pull the piston 412 back to the initial position A and the fluid is shut off as the o-ring 419 seals the opening.

Although any orientation of the main axis of the spout 400 and shut-off mechanism 410 has been contemplated, the preferred orientation is vertical.

Although the faucet device according to the invention is intended to function as a faucet for dispensing of water, preferably from water filter and water purification apparatus, there are other applications to which the faucet device is suitable. For example, attaching it to a beer dispensing system such that it replaces a normal beer tap, where the self-closing function is suitable for filling beer glasses, and the fixed position is suitable for filling larger beer containers such as pitchers or the like. The faucet device may also replace other drink dispensing systems, e.g. soft drinks, juices etc. The faucet device may also be attached to a bathtub.

The faucet device according to the present invention may be of any suitable material or mixtures thereof. Preferably the spout and outer parts are made of a suitable metal such as aluminum, stainless steel, or the like and/or a suitable coating such as chromium or the like.

Where technical features mentioned in any claim are followed by reference signs, those reference signs have been included for the sole purpose of increasing the intelligibility of the claims and accordingly, such reference signs do not have any limiting effect on the interpretation of each element identified by way of example by such reference signs.

What is claimed is:

1. A faucet device for dispensing of a pressurised fluid, the faucet device comprising an outlet member and a shut-off mechanism including a shut-off valve, said outlet member including an initial position in which the flow of fluid through the outlet member is shut off, said shut off mechanism being arranged such that said outlet member, when subjected to an external force in a certain first direction enters a self-closing open position allowing flow through the same, and when said force is no longer applied said outlet member returns to the initial position by a self closing mechanism, wherein said shut-off mechanism further is arranged such that when the outlet member is subjected to a force in a second direction different from said first direction, the outlet member is releasably held in a certain position allowing flow through the same, wherein the shut-off valve is configured to open when the outlet member is moved to the open position and to close when the outlet member is returned to the initial position, the shut-off valve including an irregularity which inclines radially from a central portion to an edge portion, wherein an end portion of an upstream extending protrusion of the shut-off mechanism is configured to actuate the shut-off valve by moving against the irregularity.

2. A faucet device according to claim 1, wherein said outlet member is arranged to release from the position when the outlet member is subjected to a force substantially opposite to the second direction.

3. A faucet device according to claim 1, comprising a guide member to guide the outlet member movement between said positions.

4. A faucet device according to claim 1, wherein said second direction is opposite to said first direction.

5. A faucet device according to claim 1, wherein the outlet member is tiltable.

6. A faucet device according to claim 1, wherein the outlet member is pivotable about an axis.

7. A faucet device according to claim 1, wherein the outlet member is vertical in the initial position.

8. A faucet device according to claim 1, wherein the shut-off mechanism comprises an, at least partly, spherical member, fixedly connected to the upstream portion of the outlet member, supporting a housing, and being tiltably and pivotably arranged within the housing, the housing including a circular configuration and a channel configuration arranged through said spherical member for allowing fluid there through when the outlet member is moved to an open position.

9. A faucet device according to claim 8, comprising a seal configured such that when the shut-off valve is closed no fluid is allowed through the channel configuration.

10. A faucet device according to claim 8, comprising sealing members provided in said housing, the sealing members being part of a seat for the spherical member.

11. A faucet device according to claim 8, wherein the shut-off valve is resiliently arranged upstream of the spherical member.

12. A faucet device according to claim 8, wherein the downstream surface of the shut-off valve has the irregularity, wherein the spherical member includes the end portion of the upstream extending protrusion, which, in the initial position, is centrally arranged against said surface, and that said protrusion further is arranged such that when the outlet member is tilted, the protrusion is tilted, and the end portion of the protrusion slides against the inclination of said surface, pressing the resilient valve upstream, allowing fluid to flow through the channel configuration and further through the outlet member.

13. A faucet device according to claim 12, wherein the irregularity is a recess including a funnel-shaped profile and configured such that the end portion of the protrusion, when the outlet member is tilted to the locked position, is arranged to lock against the edge portion of the surface, and that, on the cap portion of the outlet member there is provided a blocking member, arranged such that when the outlet member is tilted to the self-closing position, the end portion of the protrusion is prevented from reaching the edge portion, the end portion of the protrusion being subjected to a force from a resilient member of the valve, forcing the end portion back to the central portion of the recess when the external pressure on the outlet member is released.

14. A faucet device according to claim 13, wherein a blocking member is integrated in the cap portion of the outlet member forming a projection arranged such that when the outlet member is tilted in the direction of the self closing open position the block member reaches a portion of the housing stopping the movement prior to the end portion of the protrusion reaching the edge portion.

15. A faucet device according to claim 3, wherein the guide member integrated in a cap portion of the upstream portion of the outlet member, the guide member including a V-shaped configuration, the tips of the guide member being in slidable contact with an edge of a downstream protrusion of the housing and arranged such that that when the outlet member is in the initial position an angle is formed between a first portion of the guiding member and the edge and an angle being larger than the angle between a second portion of the guide member and the edge.

16. A faucet device according to claim 8, wherein the channel configuration transforms into two channels terminating at the upstream side of the spherical member with two openings separated a certain distance from each other by a separation in such a way that when the outlet member is in the initial position the separation is arranged to block a flow passage located upstream of said separation, and when the outlet member is tilted in the direction towards the self-closing position the first opening is arranged to face the passage allowing flow to pass through said channel configuration until the external force on the outlet member is released, a resilient member then being arranged to force the outlet member back to the initial position, and when the outlet member is tilted in the direction towards the fixed position the second opening is arranged to face the passage, and a holding member configured to hold said outlet member in a fixed position allowing flow to pass through said channel configuration, and is arranged to release from the fixed position when the outlet member is subjected to an opposite force.

17. A faucet device according to claim 8, wherein the shut-off mechanism comprises at least one switch member and a magnetic valve, said switch member being arranged such that when the outlet member is subjected to a force and moved to the self-closing position the magnetic valve opens allowing flow through the channel configuration, and arranged to return the outlet member when the force is released, and when the outlet member is subjected to a force and moved to the fixed position the magnetic valve opens allowing flow through the channel configuration, and is arranged to release from the fixed position when the outlet member is subjected to an opposite force.

18. A faucet device according to claim 1, wherein the shut-off mechanism is housed in a housing and comprises a piston provided upstream of the outlet member, said outlet member being connected to the piston and being movably arranged in the downstream/upstream direction between the self-closing open position and the fixed position, a sealing member arranged to seal a fluid connection within the housing to the outlet member when the outlet member is in the initial position, a resilient member arranged to hold the piston in an equilibrium position such that the outlet member, when no force is applied to the outlet member, remains in the initial position, wherein the piston further is arranged such that when the outlet member is subjected to an external force in the downstream direction to the self-closing open position the piston is moved from the sealing member such that fluid is allowed through the fluid connection to the outlet member and is forced back to the equilibrium position by the resilient member when the force on the outlet member is released, and when the outlet member is subjected to an upstream force to the fixed position, resilient holding members are arranged to releasably hold the piston allowing continuous flow through the fluid connection to the outlet member, and when subjected to a substantially opposite force the piston is forced back to the equilibrium position by the resilient member.

19. A faucet device according to claim 1, wherein the fluid is water and wherein the water is provided from a water purification device.

20. A method for dispensing of a pressurised fluid with a faucet device comprising an outlet member, a housing, and a shut off mechanism, the method comprising:
placing said outlet member in an initial position in which the flow of fluid through the outlet member is shut off, said shut off mechanism allowing flow through said outlet member, wherein the shut off mechanism includes a shut-off valve including an irregularity which inclines radially from a central portion to an edge portion, wherein an end portion of an upstream extending protrusion of the shut-off mechanism is configured to actuate the shut-off valve by moving against the irregularity;
subjecting said outlet member to an external force in a certain first direction to place the outlet member in a self-closing open position;
ceasing application of said force on said outlet member to allow said outlet member to return to the initial position by a self closing mechanism; and
subjecting said outlet member to an external force in a second direction different from said first direction to place the outlet member in a certain position where the outlet member is releasably held and said shut off mechanism allows flow through said outlet member.

21. A method according to claim 20, comprising subjecting said outlet member to a force in a direction substantially opposite to the second direction to release the outlet member from said position.

22. A method according to claim 20, wherein said second direction is opposite to said first direction.

23. A faucet device comprising an outlet member and a shut-off mechanism, said outlet member including an initial position in which the flow of fluid through the outlet member is shut off, said shut off mechanism being arranged such that said outlet member, when subjected to an external force in a certain first direction enters a self-closing open position allowing flow through the same, and when said force is no longer applied said outlet member returns to the initial position by a self closing mechanism, wherein said shut-off mechanism is arranged such that when the outlet member is subjected to a force in a second direction different from said first direction, the outlet member is releasably held in a certain position allowing flow through the same, wherein the shut-off mechanism comprises an at least partly spherical member, fixedly connected to the upstream portion of the outlet member, the at least partly spherical member being tiltably and pivotably arranged within the housing, the housing including a channel configuration arranged through the at least partly spherical member for allowing fluid therethrough when the outlet member is moved to the open position, the shut off mechanism including a shut-off valve arranged to open when the outlet member is moved to the open position and to close when the outlet member is returned to the initial position, the shut-off valve including an irregularity inclining radially from a central portion to an edge portion, wherein the end portion of an upstream extending protrusion of the at least partly spherical member, in the initial position, is centrally arranged against said surface, and that said protrusion is arranged such that when the outlet member is tilted, the protrusion is tilted, and the end portion of the protrusion slides against the inclination of said surface, pressing the shut-off valve upstream, allowing fluid to flow through the channel configuration and further through the outlet member.

24. A faucet device according to claim 23, wherein the irregularity is a recess including a funnel-shaped profile and configured such that the end portion of the protrusion, when the outlet member is tilted to the locked position, is arranged to lock against the edge portion of the surface, and that, on the cap portion of the outlet member there is provided a blocking member, arranged such that when the outlet member is tilted to the self-closing position, the end portion of the protrusion is prevented from reaching the edge portion, the end portion of the protrusion being subjected to a force from a resilient member of the valve, forcing the end portion back to the central portion of the recess when the external pressure on the outlet member is released.

25. A faucet device according to claim 24, wherein a blocking member is integrated in the cap portion of the outlet member forming a projection arranged such that, when the outlet member is tilted in the direction of the self closing open position, the block member reaches a portion of the housing stopping the movement prior to the end portion of the protrusion reaching the edge portion.

26. A faucet device comprising an outlet member, a shut-off mechanism, and a guide member, said outlet member including an initial position in which the flow of fluid through the outlet member is shut off, said shut off mechanism being arranged such that said outlet member, when subjected to an external force in a certain first direction enters a self-closing open position allowing flow through the same, and when said force is no longer applied said outlet member returns to the initial position by a self closing mechanism, wherein said shut-off mechanism is arranged such that when the outlet member is subjected to a force in a second direction different from said first direction, the outlet member is releasably held in a certain position allowing flow through the same, wherein the guide member is configured to guide the outlet member movement between said positions, the guide member being integrated in a cap portion of the upstream portion of the outlet member, the guide member including a V-shaped configuration, the tips of the guide member being in slidable contact with an edge of a downstream protrusion of the housing and arranged such that that when the outlet member is in the initial position an angle is formed between a first portion of the guiding member and the edge and an angle being larger than the angle between a second portion of the guide member and the edge.

* * * * *